United States Patent
Le Leannec et al.

(10) Patent No.: US 8,897,362 B2
(45) Date of Patent: Nov. 25, 2014

(54) METHOD AND DEVICE FOR PROCESSING A SEQUENCE OF DIGITAL IMAGES WITH SPATIAL OR QUALITY SCALABILITY

(75) Inventors: Fabrice Le Leannec, Mouaze (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 2409 days.

(21) Appl. No.: 11/489,588

(22) Filed: Jul. 20, 2006

(65) Prior Publication Data
US 2007/0019721 A1   Jan. 25, 2007

(30) Foreign Application Priority Data
Jul. 22, 2005   (FR) ...................................... 05 07853

(51) Int. Cl.
| | | |
|---|---|---|
| H04N 7/12 | (2006.01) | |
| H04N 19/61 | (2014.01) | |
| H04N 19/615 | (2014.01) | |
| H04N 19/17 | (2014.01) | |
| H04N 19/63 | (2014.01) | |
| H04N 19/55 | (2014.01) | |
| H04N 19/129 | (2014.01) | |
| H04N 19/13 | (2014.01) | |

(52) U.S. Cl.
CPC ... *H04N 19/00818* (2013.01); *H04N 19/00781* (2013.01); *H04N 19/00787* (2013.01); *H04N 19/0026* (2013.01); *H04N 19/00121* (2013.01); *H04N 19/00642* (2013.01); *H04N 19/00115* (2013.01)
USPC ............ 375/240.12; 375/240.14; 375/240.16; 382/233; 382/232

(58) Field of Classification Search
CPC .................... H04N 19/00321; H04N 9/00545; H04N 19/00781; H04N 19/00042; H04N 19/00278; H04N 19/00424; H04N 19/00436; H04N 19/0003; H04N 19/0009; H04N 19/00121; H04N 19/00139; H04N 19/00175; H04N 19/002
USPC .......................................... 375/240.1, 240.16
See application file for complete search history.

(56) References Cited

U.S. PATENT DOCUMENTS

| | | | |
|---|---|---|---|
| 6,501,860 B1 | 12/2002 | Charrier et al. | ............... 382/240 |
| 6,891,895 B1 | 5/2005 | Onno et al. | ................... 375/260 |
| 6,961,383 B1 * | 11/2005 | Reibman et al. | ......... 375/240.25 |

(Continued)

OTHER PUBLICATIONS

Wiegand "Scalable Extension of H.264/AVC" ISO/IEC JTC1/SC29/WG11, Mar. 2004.*

(Continued)

*Primary Examiner* — Jessica M Prince
(74) *Attorney, Agent, or Firm* — Fitzpatrick, Cella, Harper & Scinto

(57) ABSTRACT

A method of temporal prediction using motion estimation is implemented in a sequence of digital images, in the context of coding in a bitstream comprising at least first and second layers linked to each other in a chosen hierarchical relationship of scalability. Provision is made for constructing at least one set of reference pixels for the temporal prediction on the basis of information from a prediction image of the second layer and complementary information from an image of the first layer corresponding temporally to the prediction image. For each block of the current group of the image of the current second layer, a search is made for at least one block of the reference set of pixels so constructed that is suitable for the temporal prediction; and at least one corresponding motion vector is determined.

20 Claims, 10 Drawing Sheets

(56) References Cited

U.S. PATENT DOCUMENTS

| | | | |
|---|---|---|---|
| 7,113,643 B2 | 9/2006 | Le Leannec et al. | 382/235 |
| 7,190,838 B2 | 3/2007 | Le Leannec et al. | 382/233 |
| 7,212,678 B2 | 5/2007 | Brown et al. | 382/240 |
| 7,215,819 B2 | 5/2007 | Onno et al. | 382/240 |
| 7,260,264 B2 | 8/2007 | Guillou et al. | 382/232 |
| 7,903,735 B2 * | 3/2011 | Cha et al. | 375/240.12 |
| 2002/0048319 A1 | 4/2002 | Onno | 375/240 |
| 2003/0174897 A1 | 9/2003 | Le Leannec et al. | 382/240 |
| 2004/0012820 A1 | 1/2004 | Donescu et al. | 358/3.28 |
| 2004/0042486 A1 | 3/2004 | Onno et al. | 370/466 |
| 2004/0068587 A1 | 4/2004 | Le Leannec et al. | 709/247 |
| 2005/0147164 A1 * | 7/2005 | Wu et al. | 375/240.12 |
| 2006/0153300 A1 * | 7/2006 | Wang et al. | 375/240.16 |
| 2006/0256851 A1 * | 11/2006 | Wang et al. | 375/240.01 |
| 2007/0127576 A1 | 6/2007 | Henocq et al. | 375/240.16 |
| 2007/0216699 A1 | 9/2007 | Le Leannec et al. | 345/555 |
| 2007/0223033 A1 | 9/2007 | Onno et al. | 358/1.15 |
| 2007/0286508 A1 | 12/2007 | Le Leannec et al. | 382/240 |
| 2008/0025399 A1 | 1/2008 | Le Leannec et al. | 375/240.16 |
| 2008/0130736 A1 | 6/2008 | Onno et al. | 375/240.01 |

OTHER PUBLICATIONS

Truong Cong Thang., et al. "Spatial Scalability of Mulitple ROI's in Surveillance Video" pp. 1-13, Apr. 2005, Internet: URL:http://ftp3.itu.int/av-arch/jvt-site/2005_04_Busan/JVT-0037.doc>.

Schwarz, H. et al.: "Scalable Extension of H.264/AVC", ISO/IEC JTC1/CS29/WG11 MPEG04/M10569/S03, pp. 1-39, Mar. 2004.

* cited by examiner

METHOD AND DEVICE FOR PROCESSING A SEQUENCE OF DIGITAL IMAGES WITH SPATIAL OR QUALITY SCALABILITY

FIELD OF THE INVENTION

The present invention concerns the processing of a sequence of digital images with spatial or quality scalability It has an application in the SVC (Scalable Video Coding) video compression system, which is an extension of the video compression standard H264/AVC, described in particular in the document by G. Sullivan, T. Wiegand, and A. Luthra. Text of ISO/IEC 14496 10 Advanced Video Coding 3rd Edition. ISO/IEC JTC 1/SC 29/WG 11, Redmond, Wash., USA, July 2004.

It also has an application in the video standards for scalable video compression in the spatial and quality dimension and provides the functionality of spatial random access, i.e. the possibility of extracting and decoding a portion of the compressed bitstream representing a particular spatial region, such as H263+ and H263++.

BACKGROUND OF THE INVENTION

The SVC standard provides a scalable or hierarchical compressed representation of a digital video sequence. It provides support for scalability along the following three axis: temporal, spatial and quality scalability. All the functionalities of the SVC standard also provide for the inclusion of spatial random access.

The SVC compression system, the current version of which is described in particular in the document by J. Reichel, H. Schwarz, and M. Wien. Scalable Video Coding—Working Draft 1. Joint Video Team (JVT) of ISO/IEC MPEG & ITU-T VCEG, Hong Kong, China, January 2005, and constitutes a compatible extension of H264/AVC, provides the spatial random access functionality via the use of groups of macroblocks of pixels, also termed slice groups. The H264/AVC standard defines several types of slice groups and enables it to be indicated which slice group of a given type each 16×16 macroblock belongs to. In particular, the slice groups of type 2 are defined with the aim of performing video coding by regions of interest. The slice groups of type 2 designate foreground slice groups, i.e. rectangular sets of macroblocks, and one background slice group. Consequently, a division of the images of the video sequence into a grid of rectangular slice groups makes it possible to implement the spatial random access function in a compressed video sequence.

However, spatial random access is only made possible by constraining the processes of motion estimation and compensation. More particularly, the objective is to be able to extract a sub-set from the compressed video stream which corresponds to the spatial region which it is desired to decode and to display. This constraint on the temporal prediction across boundaries of slice groups is indicated in a supplemental enhancement message of SEI (Supplemental Enhancement Information) type. This constraint consists of limiting the size of the spatial window authorized for the motion vectors of the macroblock partitions of a given slice group. More particularly, given a macroblock to code, the motion estimation consists, for each macroblock partition, of searching in a list of possible reference images for the macroblock (or macroblock partition) which is the most similar to the current partition in terms of the SAD (Sum of Absolute Differences). Since this search is restricted to a spatial region delimited by one or more rectangular slice groups, the search is constrained and potentially leads to sub-optimal coding in terms of rate-distortion.

The present invention mitigates this drawback.

SUMMARY OF THE INVENTION

The invention concerns a method of temporal prediction using motion estimation in a sequence of digital images, in the context of coding in a bitstream comprising at least first and second layers linked to each other in a chosen hierarchical relationship of scalability, each image of the second layer comprising a plurality of groups of blocks of pixels, said coding enabling the access to spatial parts of the images, the method of temporal prediction being applied to at least one current group of an image of the current second layer of the sequence.

According to a general definition of the invention, the method comprises the following steps:

constructing at least one reference set of pixels for the temporal prediction on the basis of information from a prediction image of the second layer and complementary information from an image of the first layer corresponding temporally to said prediction image; and for each block of the current group of the image of the current second layer, searching for at least one block of the reference set of pixels so constructed that is suitable for the temporal prediction; and determining at least one corresponding motion vector.

The method of temporal prediction according to the invention thus consists of extending the temporal prediction by performing, in the motion estimation step, the search for a reference set of pixels not only in the slice groups authorized for that purpose, but also in other parts of the prediction image considered, by using the knowledge of the scene from the basic image temporally corresponding to the prediction image considered.

By virtue of the method according to the invention, the partitions of macroblocks (or sub-macroblocks) in a given slice group may use data of the prediction image outside the set of slice groups restricted for the field of motion of the current slice group. The functionality of spatial random access is still fulfilled, and the effectiveness of compression and/or of the quality of reconstruction of the spatial refinement layer is improved with respect to the prior art.

In practice, the bitstream coding is of SVC type.

According to one embodiment, the information from the second layer contained in the reference set of pixels is data from the current group of the prediction image of the second layer. Thus, the reference set of pixels contains data of the group of blocks considered of at least one prediction image of same layer of the bitstream.

According to a preferred feature, the complementary information is data belonging to the group corresponding spatially to the current group in the first layer and spatially surrounding the data of the reference set of pixels. Thus, the reference set of pixels is increased by data from at least one image of another layer of the bitstream, so as to cover a larger spatial region for prediction.

According to a preferred embodiment, the images of the first layer each comprise a single group of blocks of pixels. By virtue of this feature, all the pixels of the image temporally corresponding to the prediction image of the second layer are usable as information that is complementary to the reference set, which makes it possible to obtain a maximized reference set of pixels.

In practice, the configuration of the groups of blocks of the second layer is rectangular. Thus, the spatial random access to a particular region of the images of the sequence is facilitated.

According to a preferred embodiment of the invention, the second layer is a refinement layer of spatial scalability. In this case, the complementary data are upsampled to the spatial resolution of the reference set of pixels.

According to another preferred embodiment of the invention, the second layer is a refinement layer of quality scalability.

In practice, the prediction image belongs to at least one list of prediction images.

According to still another preferred embodiment of the invention, the bitstream further comprises a third layer and the step of constructing at least one reference set of pixels comprises a step of increasing the number of reference pixels for the temporal prediction on the basis of complementary information from an image of the third layer temporally corresponding to said prediction image.

The advantage of the method of temporal prediction according to the invention in the spatially scalable compression mode is more effective compression and/or an improvement in the quality of the reconstructed image in certain video scenes, in particular scenes comprising translational movements. No addition to the syntax of the SVC bitstream is necessary to indicate this new coding mode, since it is automatically detectable by the scalable video decoder.

The present invention introduces a supplementary temporal prediction mode with respect to the prediction modes already available in the context of SVC, and when rectangular slice groups are coded in a refinement layer to enable the spatial random access.

The present invention also relates to a method of coding a sequence of digital images in a bitstream comprising at least first and second layers linked to each other in a chosen hierarchical relationship of scalability, each image of the second layer comprising a plurality of groups of blocks of pixels, said coding enabling the access to spatial parts of the images.

According to this other aspect of the invention, for at least one current group of an image of the second layer of the sequence, the method comprises the steps of:

performing temporal prediction using motion estimation according to the method stated above, providing, for each block of the current group, at least one prediction image index and at least one associated motion vector; and for each block of the current group, coding the at least one prediction image index and the at least one associated motion vector so obtained.

The coding method according to the invention has the advantage of enabling the effectiveness of the coding and/or the quality of reconstruction to be improved, while maintaining the possibility of spatial random access, without having additional information to code and to transmit.

The invention is particularly advantageous in the context of SVC.

The present invention also relates to a method of decoding a sequence of digital images coded in a bitstream comprising at least first and second layers linked to each other in a chosen hierarchical relationship of scalability, each image of the second layer comprising a plurality of groups of blocks of pixels, comprising a temporal prediction using motion compensation for at least one current group.

According to this other aspect of the invention, the decoding of at least one current block of said group of an image of the second layer comprises the following steps:

decoding the at least one index of the prediction image and at least one motion vector associated with said block;

verifying whether the motion vector so decoded goes out of the current group in the prediction image;

in case of positive verification, extracting data from the image of the first layer temporally corresponding to the prediction image that spatially correspond to the position indicated by the motion vector and that are complementary with respect to the current group;

using the data so obtained for the motion compensation.

The method of decoding according to the invention thus makes it possible to easily find the data that served for the prediction of the blocks which came from the first prediction layer. As in the case of the coding method set out above, the decoding method proves to be particularly effective in practice when the coding of the bitstream is of SVC type.

The present invention also relates to a device for temporal prediction using motion estimation in a sequence of digital images, in the context of coding in a bitstream comprising at least first and second layers linked to each other in a chosen hierarchical relationship of scalability, each image of the second layer comprising a plurality of groups of blocks of pixels, said coding enabling the access to spatial parts of the images, the temporal prediction being applied to at least one current group of an image of the current second layer of the sequence.

According to one aspect of the invention, the temporal prediction device comprises:

means for constructing at least one reference set of pixels for the temporal prediction on the basis of information from a prediction image of the second layer and complementary information from an image of the first layer corresponding temporally to said prediction image; and processing means adapted, for each block of the current group of the image of the current second layer, to search for at least one block of the reference set of pixels so constructed that is suitable for the temporal prediction; and to determine at least one corresponding motion vector.

The present invention also relates to a device for coding a sequence of digital images in a bitstream comprising at least first and second layers linked to each other in a chosen hierarchical relationship of scalability, each image of the second layer comprising a plurality of groups of blocks of pixels, said coding enabling the access to spatial parts of the images.

According to this other aspect of the invention, for at least one current group of an image of the second layer of the sequence, the device comprises:

means for prediction using motion estimation in accordance with the means of the prediction device mentioned above, providing, for each block of the current group, at least one prediction image index and at least one associated motion vector, and coding means that are adapted, for each block of the current group, to code at least one prediction image index and at least one associated motion vector so obtained.

The present invention also relates to a device for decoding a sequence of digital images coded in a bitstream comprising at least first and second layers linked to each other in a chosen hierarchical relationship of scalability, each image of the second layer comprising a plurality of groups of blocks of pixels, comprising a temporal prediction using motion compensation for at least one current group.

According to this other aspect of the invention, the decoding device comprises, for the decoding of at least one current block of said group of an image of the second layer:

means for decoding the at least one index of the prediction image and at least one motion vector associated with said block;

verifying means for verifying whether the motion vector so decoded goes out of the current group in the prediction image;

processing means that are adapted, in case of positive verification, to extract data from the image of the first layer temporally corresponding to the prediction image that spatially correspond to the position indicated by the motion vector and that are complementary with respect to the current group; and using data so obtained for the motion compensation.

The predicting, coding and decoding devices have similar advantages to the advantages of the associated methods.

The present invention also relates to an information carrier readable by a computer system, possibly wholly or partly removable, in particular a CD-ROM or magnetic medium, such as a hard disk or a diskette, or a transmissible medium, such as an electrical or optical signal, characterized in that it comprises instructions of a computer program enabling the implementation of the method according to the invention, when that program is loaded and run by a computer system.

Finally, the present invention relates to a computer program stored on an information carrier, said program comprising instructions enabling the implementation of the method in accordance with the invention, when that program is loaded and run by a computer system.

Other features and advantages of the invention will appear in the light of the following detailed description and drawings.

DETAILED DESCRIPTION OF THE PREFERRED EMBODIMENT

The present invention has a particular application in SVC format, and the following description is based on that format. Nevertheless, the invention may have an application in other multilayer video coding formats, where each layer is divided into at least one group of blocks (slice group), and which allow spatial random access by virtue of the division into groups of blocks.

In the context of SVC, the invention has a notable advantage when the basic layer is coded with a single slice group, which means that the set of the pixels of that layer are contained in that group of blocks and are available to the coder and to the decoder, for any requested spatial random access.

Figure 1:
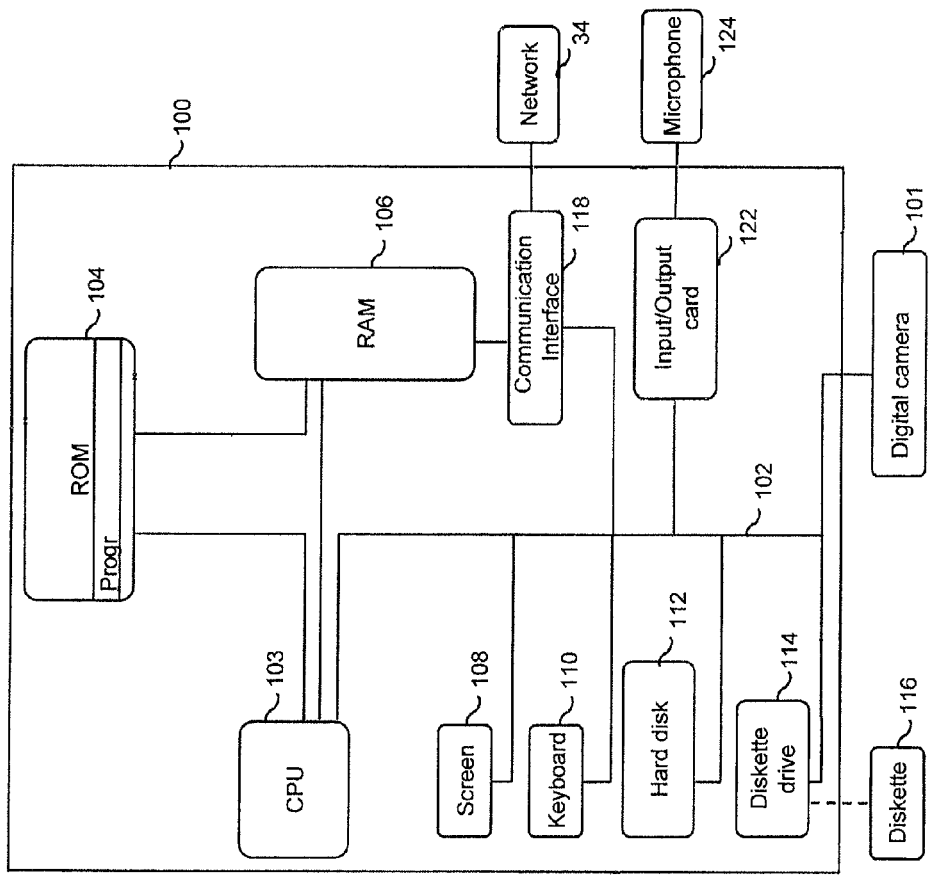
FIG. 1 represents a device adapted to implement the method according to the invention.

With reference to FIG. 1, a device, such as a micro-computer and its different peripherals, may implement the methods of temporal prediction, coding and decoding according to the invention. The device is for example a microcomputer 100 connected to different peripherals, for example a digital camera 101 (or a scanner, or any image acquisition or storage means) connected to a graphics card and supplying information to compress according to the invention. The device 100 comprises a communication interface 118 connected to a network 34 able to transmit digital data to be compressed or to transmit data compressed by the device. The device 100 also comprises a storage means 112 such as a hard disk. It also comprises a diskette drive 114. The diskette 116 as well as the disk 112 can contain data compressed according to the invention as well as the code of the invention which, once read by the device 100, will be stored on the hard disk 112.

As a variant, the program enabling the device to implement the invention can be stored in read only memory 104 (referred to as ROM in the drawing).

In a second variant, the program can be received in order to be stored in an identical manner to that described previously via the communication network 34. The device 100 is connected to a microphone 124 via the input/output card 122. The data to be transmitted according to the invention will in this case be audio signal. This same device has a screen 108 making it possible to view the data to compress or decompress or to serve as an interface with the user, who will be able to parameterize certain compression format options for example, using the keyboard 110 or any other means (a mouse for example). The central processing unit 103 (referred to as CPU in the drawing) will execute the instructions relating to the implementation of the invention, which are stored in the read only memory 104 or in the other storage means. On powering up, the decompression programs stored in a non-volatile memory, for example the ROM 104, are transferred into the random-access memory RAM 106, which will then contain the executable code of the invention, as well as registers for storing the variables necessary for implementing the invention. Naturally, the diskettes may be replaced by any form of information carrier such as CD-ROM, or memory card. In more general terms, an information storage means, which can be read by a computer or microprocessor, integrated or not into the device, and which may possibly be removable, stores a program implementing the method according to the invention. The communication bus 102 affords communication between the different elements included in the microcomputer 100 or connected to it.

The representation of the bus 102 is not limiting and, in particular, the central processing unit 103 is able to communicate instructions to any element of the microcomputer 100 directly or via another element of the microcomputer 100.

Figure 2:
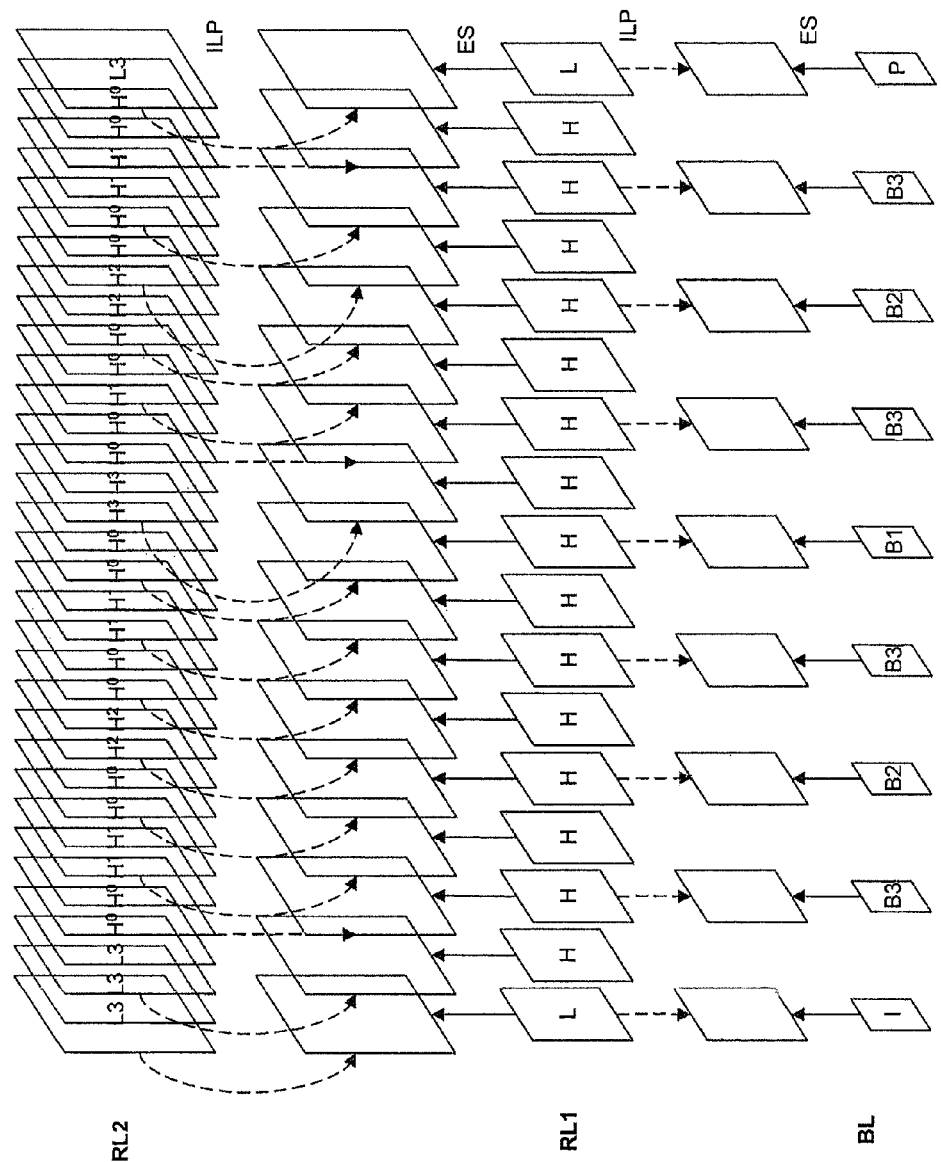
FIG. 2 is a multilayer representation of a multilayer video sequence in SVC according to the prior art.

FIG. 2 is a multilayer representation of a video sequence in SVC format.

The SVC video compression system provides scalabilies in the temporal, spatial and SNR (quality) dimensions.

The temporal scalability is obtained via the hierarchical images B (described in detail below) in the basic layer BL, and by virtue of the MCTF (Motion Compensated Temporal Filtering) described with reference to FIG. 3) in the refinement layers RL. As indicated in FIG. 2, the MCTF provides a set of temporal approximation images termed low-pass images and denoted L in FIG. 2, as well as a set of temporal detail images termed high-pass images and denoted H.

The SNR scalability exists in two forms. The fine SNR scalability, denoted FGS (Fine Granular Scalability) is obtained by progressive quantization of the slices. The coarse SNR scalability or CGS (Coarse Grain SNR scalability) is provided by the predictive coding of a layer in which an MCTF operation is performed independently of the lower layer, and which is predicted from the layer directly below.

Finally, the spatial scalability is obtained by predictive coding of a layer in which an MCTF operation is performed independently of the lower layer. The coding of a spatial refinement layer is similar to that of a CGS layer, except that it serves to compress the video sequence at a higher spatial resolution level than the lower layer. It includes among others a step ES of spatial upsampling by 2 in both spatial dimensions (width and height) in the inter layer prediction process.

The present invention is applicable in the context of the coding of the spatial and CGS refinement layers and concerns, at the coder, the motion estimation during the prediction step in the MCTF process. At the decoder, the invention concerns the motion compensation in the inverse prediction of the process of inverse MCTF reconstruction.

FIG. 2 illustrates an example of multilayer organization with that is possible with SVC, organized hierarchically in increasing order of spatial refinement. The basic layer BL represents the sequence at its lowest spatial resolution level and is compressed in a manner compatible with the H264/AVC standard. As indicated in the drawing, it is composed of hierarchical images of I, P and B type. The hierarchical B images constitute a means for generating a scalable basic layer in the temporal dimension. They are denoted Bi, i≥1, and follow the following rule: an image of type Bi may be temporally predicted on the basis of the I or P anchoring images surrounding it, as well as the Bj, j>i images located in the same range of I or P anchoring images. The Bi images can only be predicted from the anchoring images surrounding it.

Furthermore, two spatial refinement layers are illustrated, individualized as RL1 and RL2. The first of them, RL1 is coded predictively with respect to the basic layer BL, and the second refinement layer RL2 is predicted from the first RL1. A step ES of spatial upsampling by 2 occurs during these predictions between layers, also termed inter layer prediction ILP.

Figure 3:
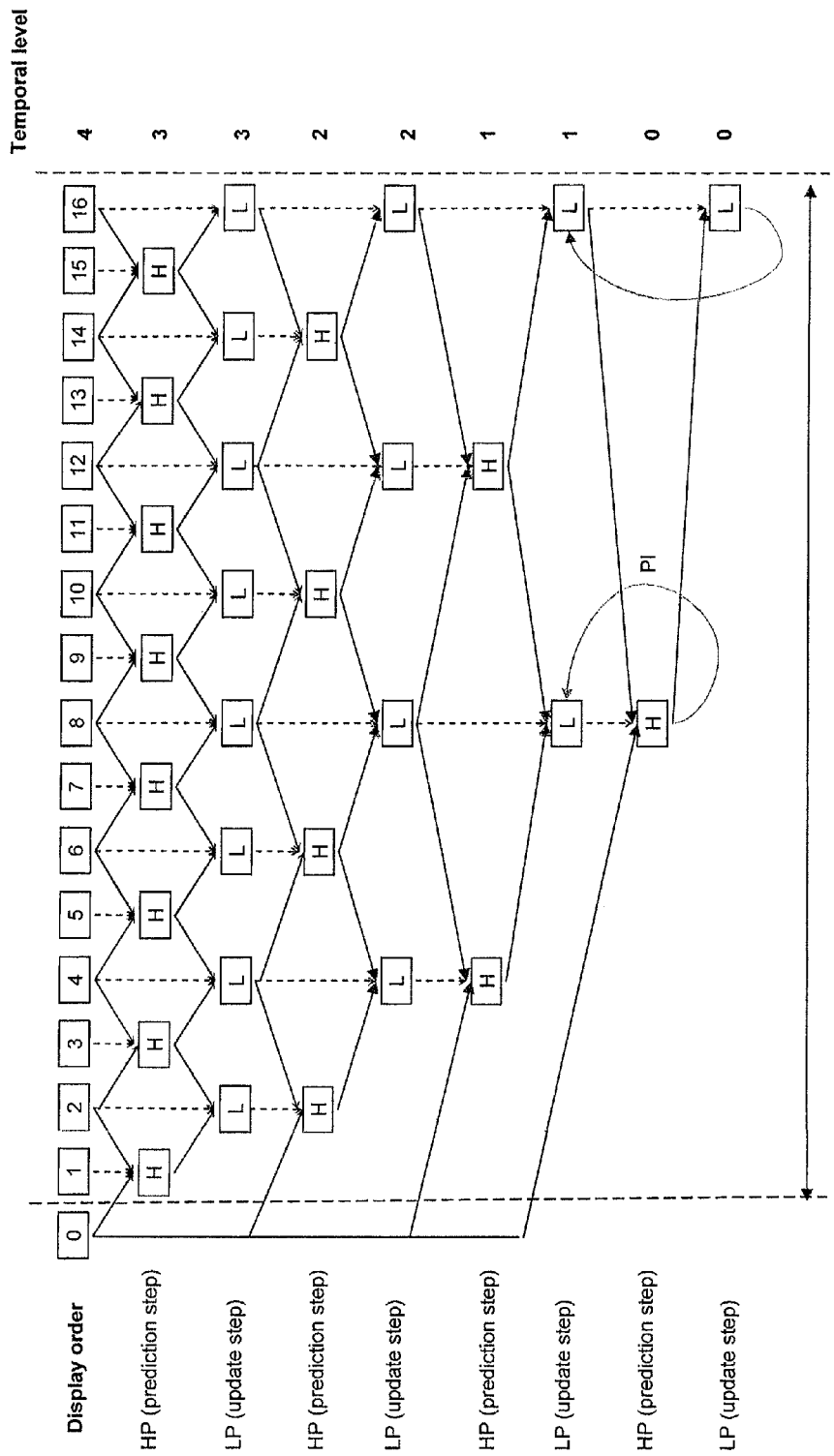
FIG. 3 represents the motion compensated temporal filtering of the MCTF (Motion Compensated Temporal Filtering) type according to the prior art.

FIG. 3 represents the motion compensated temporal filtering of MCTF type.

Such filtering provides a multi-resolution representation in the temporal dimension of a GOP (Group of Pictures).

A wavelet transformation in the temporal direction is performed. Each stage of decomposition consists of a low-pass filtering operation followed by decimation by 2 as well as a high-pass filtering operation followed by decimation by 2 of a group of pictures. It thus provides a set of low-pass approximation images and a set of high-pass temporal detail images arising from the low-pass images of the preceding decomposition level.

The succession of these decomposition steps thus provides a multi-resolution representation in temporal terms of the group of pictures considered. FIG. 3 illustrates the levels of temporal representation of the group of pictures individualized from 0 to 4. The images arising from a low-pass type filtering operation are denoted L in the drawing, and the images arising from a high-pass filtering operation are denoted H.

As shown by FIG. 3, the step of generating high-pass HP images is termed prediction step, and the step of generating the low-pass LP images is termed update step. The prediction step is a motion compensated high-pass HP filtering operation. More particularly, given an original image or an intermediate low-pass image, a process of motion estimating and deciding determines the parameters of temporal prediction for each macroblock: motion vector(s), reference image(s) serving for the prediction, prediction modes for the partitions of the macroblock or of its sub-macroblocks.

Once the unidirectional or bidirectional prediction has been chosen for each partition of macroblocks or sub-macroblocks of the current macroblock, the step of high-pass filtering generates the corresponding macroblock in the high-pass image in course of construction.

In turn, FIG. 3 also illustrates the steps constituting the inverse MCTF transformation process. More particularly, the decoding and the reconstruction of the video sequence at a target temporal resolution level consists of applying, to the successive GOPs of the sequence, a succession of operations termed "inverse update step" and "inverse prediction step". The object of the "inverse prediction step" IP, illustrated in FIG. 3, is to transform a high-pass H image from a given temporal resolution level into a low-pass L image of the temporal resolution level directly above. Moreover, the "inverse update step" transforms a low-pass L image from a given temporal resolution level into a temporally corresponding low-pass L image in the temporal resolution level directly above. The ordered succession of these steps on the images of a GOP thus makes it possible to perform the process of inverse MCTF transformation, and thus to reconstitute the sequence at the desired temporal resolution level.

Figure 4:
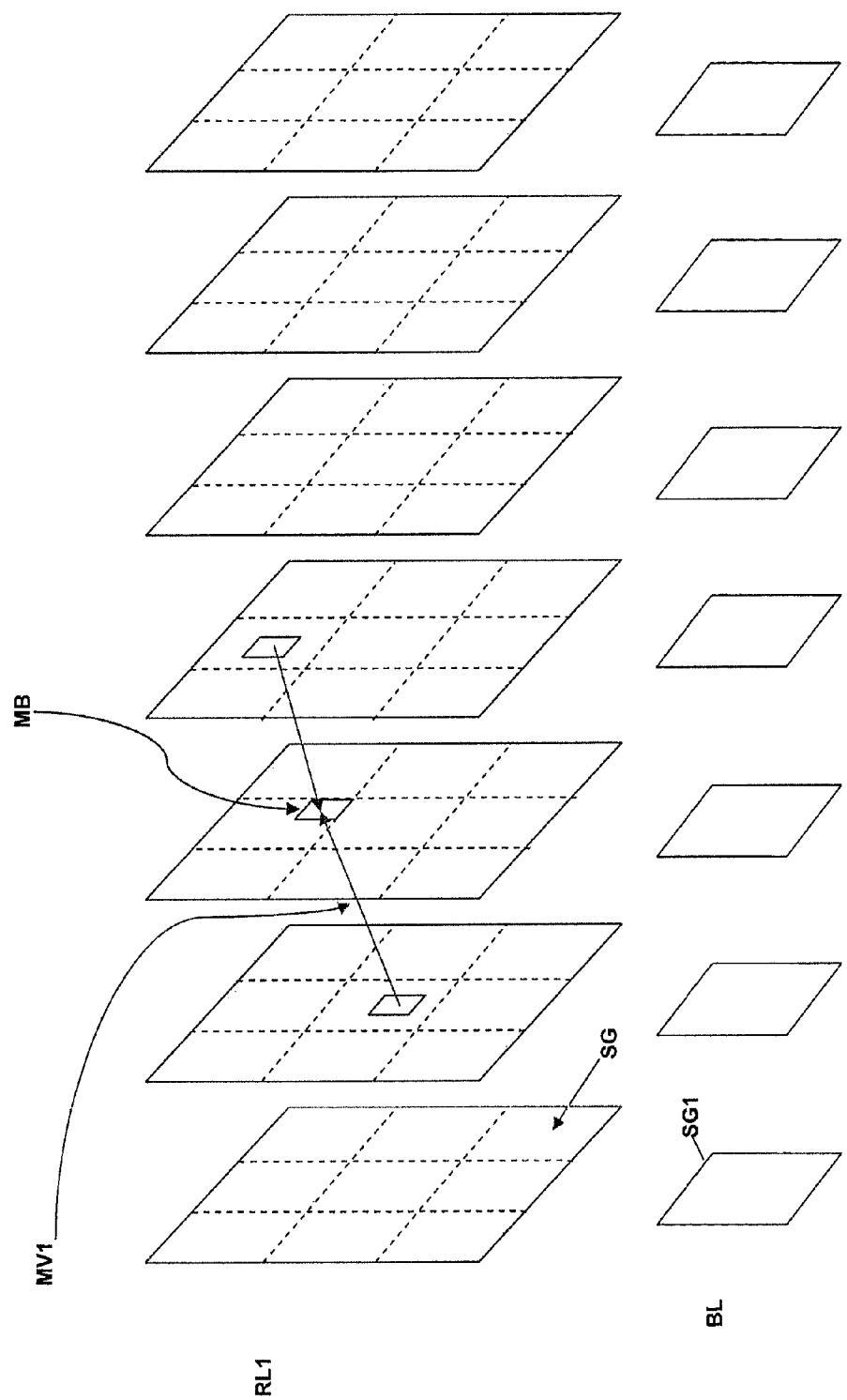
FIG. 4 represents the restriction of the fields of motion to slice groups, also termed "motion-constrained slice-group sets" according to the prior art.

The mechanisms provided in the present invention operate in the HP prediction step during the MCTF and in the inverse prediction IP step of the inverse MCTF. They thus apply in the coding and decoding operations of the CGS and spatial refinement layers. FIG. 4 represents the restriction of the motion fields to slice groups, or "motion-constrained slice-group sets", implemented to enable the spatial random access in the SVC format. The invention applies in this context.

More particularly, FIG. 4 illustrates the step of motion estimation between low-pass images L during the MCTF transformation. The images of the refinement layer (RL1) of the GOP considered are divided into rectangular slice groups SG (broken line), which are groups of macroblocks, the macroblocks being groups of blocks. The slice groups will also be referred to as "groups of blocks". FIG. 4 also illustrates the current partition of macroblocks MB, as well as candidate motion vectors MV for the temporal prediction.

Since the objective of the invention is to provide the functionality of spatial random access, the motion field MV for the current macroblock MB partition is constrained by the boundaries of the rectangular slice group containing the current macroblock MB partition. Consequently, the motion vector MV1 rearwards drawn in FIG. 4 is not permitted.

Furthermore, the H264/AVC standard optionally provides for the definition of "motion-constrained slice group sets" (see G. Sullivan, T. Wiegand, and A. Luthra. Text of ISO/IEC 14496 10 Advanced Video Coding 3rd Edition. ISO/IEC JTC 1/SC 29/WG 11, Redmond, Wash., USA, July 2004, sections D.1.19 and D.2.19). This information is transported in a message of SEI (Supplemental Enhancement Information) type and is active for a group of pictures going from the last coded IDR (Instantaneous Decoding Refresh) image to the next coded IDR image. Such a message defines a set of motion-constrained slice-groups SG and means that no sample outside that set of slice groups can serve for the temporal prediction of a sample belonging to that set of slice groups.

Consequently, such a message may be used to explicitly indicate the regions of images which must be kept decodable independently from their neighbors during a sequence or segment of video sequence, and is usable for the generation of an SVC stream with spatial random access being possible in the high resolution spatial layers. In this case, the problem of constraint on the motion vectors MV is no longer considered in relation to the boundaries of slice groups but is shifted to the boundaries of the sets of slice groups indicated by the message of SEI type above.

Consequently, the illustration of FIG. 4 remains valid if the rectangular portions delimited by broken line graphically illustrate the sets of motion-constrained slice-groups. The motion vector MV1 drawn rearwardly is thus forbidden in this case.

The present invention applies to both the cases introduced above, i.e.:

1. the case in which the images are organized into rectangular slice groups SG and in which it is desired to make each slice group decodable independently of its neighbors to enable the spatial random access;
2. the case in which the rectangular slice groups are grouped together into "motion-constrained slice group sets" and it is thus desired that each "motion-constrained slice group set" be decodable independently of the others.

The constraint on the motion field in the images divided into groups of blocks SG has the drawback of reducing the effectiveness of the compression of the video coder with respect to a configuration in which each image contains a single block. This is because it may well be that, for macroblocks MB situated at the border of the slice groups or "motion-constrained slice group sets" the best portion of prediction image for its temporal prediction is situated outside the group of blocks containing it. This may in particular occur in the case of translational movements in the original sequence of images.

The present invention makes it possible to reduce the loss in performance due to that constraint on the motion field in the temporal prediction process. For this, it is based on the following observation. The constraint imposed on the motion field deprives the motion estimator of particular knowledge as to the content of the reference images serving for the prediction, which will be termed prediction images in what follows. More particularly, the spatial portion situated around the group of blocks considered is not usable as reference image data, in that it is possible that the decoder does not posses that data, during selective transmission and decoding of a sub-set of groups of blocks of interest.

On the other hand, it may very well be that the lower spatial layers of the SVC stream are constituted by groups of blocks which spatially cover the groups of blocks of the current layer. In this case, the low-pass versions (with respect to coding) and reconstructed versions (with respect to decoding) of portions of images of the basic layer spatially surrounding the group of blocks considered may be used as reference for temporal prediction in the current layer. This is because, as the current spatial layer is predicted from the layer below, the decoder must decode the layer below in order to be able to decode the current layer. It thus possesses information from reconstructed images of the layer below. Consequently, content information is indeed possessed for the video scene around the group of blocks considered in the current layer.

In the example of FIG. 4, the SVC stream is composed of two layers, a basic layer BL and a spatial refinement layer RL1. The images of the basic layer BL each comprise a single group of blocks SG1 and the refinement layer RL1 contains several groups of blocks. Consequently, if the basic image temporally corresponding to the prediction image envisaged is available, the coder and the decoder posses information on the content of the whole scene, and may thus use that knowledge in the temporal prediction.

The present invention makes it possible to authorize the motion vectors MV across boundaries of groups of blocks, but by using reference samples coming from images of a layer BL lower than the current layer CL1 in the SVC hierarchical representation. Note that in the preferred implementation of the invention, rectangular groups of blocks are chosen, so enabling the spatial random access to portions of the images of the sequence of images.

Figure 5:
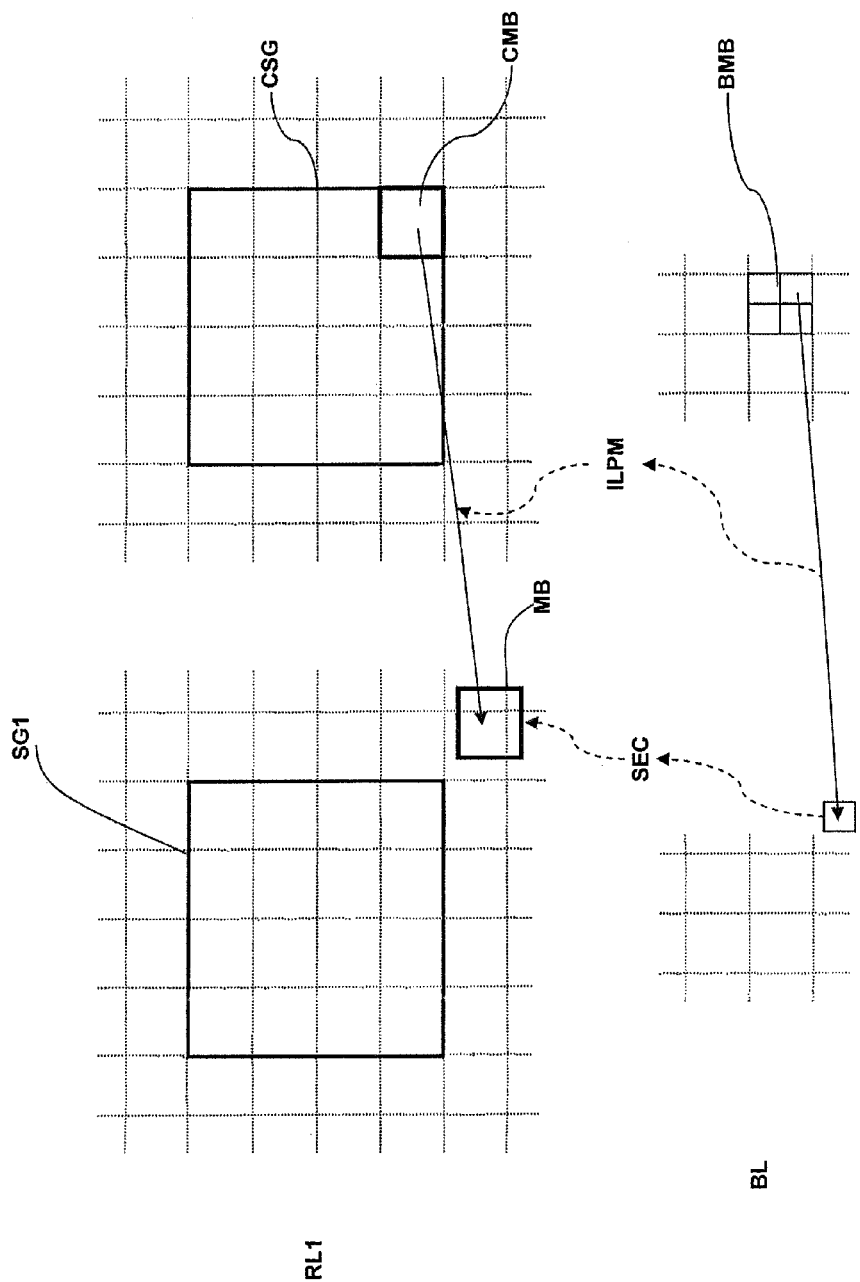
FIG. 5 represents a temporal prediction across slice group boundaries according to the invention.

FIG. 5 represents a temporal prediction across boundaries of groups of blocks according to the invention.

The diagram of FIG. 5 illustrates the mechanism of temporal prediction using motion compensation provided in this invention, performed at the decoder. Given a macroblock partition of the current refinement layer RL1, let it be assumed that the coder has decided to predict it temporally from a block (also termed macroblock partition or sub-macroblock partition) situated outside the group of blocks SG1 containing the macroblock to predict. Since the data of reconstructed images of the current layer CL1 outside the current group of blocks cannot be used, the block of spatially reconstructed pixels corresponding to the reference partition in the lower layer BL is upsampled SEC (case of a spatial refinement layer). The result of this upsampling SEC is used as reference block for the temporal prediction of the current macroblock partition.

Finally, FIG. 5 also illustrates the motion vectors used for the current macroblock partition CMB and the corresponding macroblock partition BMB in the basic layer. The inter layer prediction of the motion information ILPM is illustrated, showing that in this example, the best motion vector for the current macroblock partition CMB is similar (the only difference being the sampling factor) to that of the corresponding partition in the basic layer BL.

Figure 6:
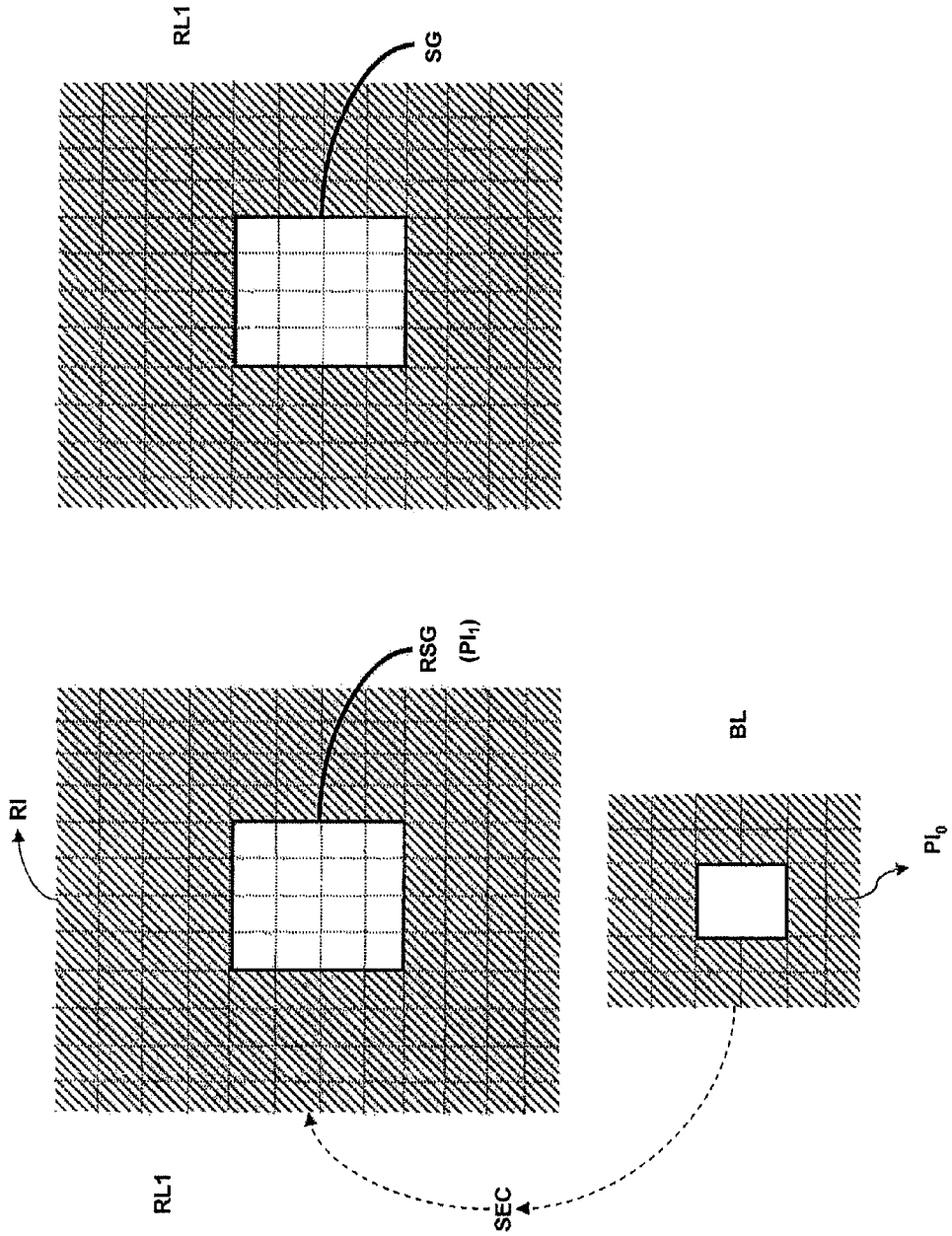
FIG. 6 represents a construction of the image of the reference set of pixels for the temporal inter prediction according to the invention.

FIG. 6 represents a construction of a reference set of pixels for the motion estimation during the temporal inter prediction performed at the coder according to the invention. In this example, the reference set is represented in the form of a reference image.

More particularly, FIG. 6 illustrates the construction of a reference image (RI) for the temporal prediction of the macroblocks of the current group of blocks (SG) to code. This step consists of composing, in the reference image, the set of the macroblocks of the same group of blocks RSG coming from a prediction image $PI_1$ of the layer RL1 and from the blocks located around that group of blocks (represented by cross-hatching in the drawing) and coming from the image $PI_0$ of the lower layer BL and temporally corresponding to the prediction image $PI_1$. $PI_0$ is thus also called the basic image of the prediction image $PI_1$ considered. It may be noted that in the example of FIG. 6, the current layer $CL_1$ corresponds to a layer of spatial refinement. Consequently, the macroblocks coming from the lower layer BL undergo a step of spatial upsampling SEC.

Furthermore, it is possible that several layers exist below the current layer, and that solely one portion of the basic image of the reference image has been used (if the basic image of the reference image is itself composed of groups of blocks). The process of composition may then be reiterated by combining the result of the first composition and macroblocks spatially located around that result coming from layers that are still lower. This further extends the reference image composed in course of construction. This iterative algorithm is explained with reference to FIG. 8.

Figure 7:
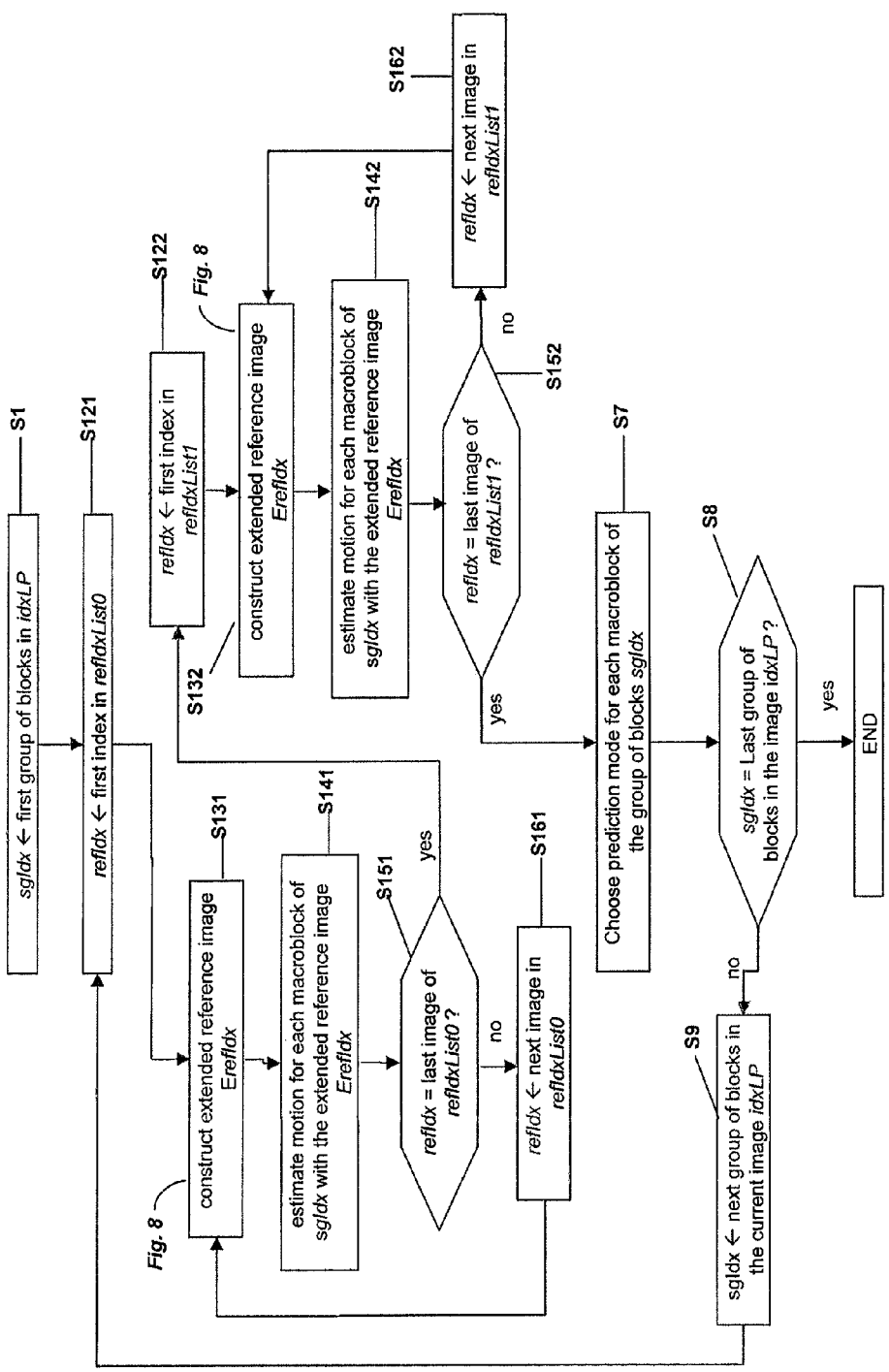
FIG. 7 is an algorithm for motion estimation according to the invention.

FIG. 7 is a prediction algorithm using motion estimation according to the invention.

More particularly, FIG. 7 describes the motion estimation algorithm modified in accordance with the invention, within the prediction step performed by the video coder during the motion compensated temporal filtering.

The inputs of the algorithm are:

The current low-pass image to be processed, having index idxLP (step S1);

the lists of indices of prediction images for the current image: refIdxList0 and refIdxList1, which correspond to sets of images temporally situated before and after the current image, in the general case of bidirectional prediction (respectively step S121 and S122).

The algorithm consists, for each group of blocks of index sgldx constituting the current image (steps S8 to S9), of going through each of the prediction images of the lists refIdxList0 then refIdxList1. Let refIdx be the index of the prediction image currently considered, during one of the two successive loops on the lists refIdxList0 then refIdxList1.

According to step S131 for the list 0 and step S132 for the list 1, a reference set ErefIdx is constructed (which is an extended reference image in this example of implementation) that is useful for the motion estimation for the macroblocks of the current group of blocks sgldx. This constructed reference image includes data of the initial prediction image of index refIdx, as well as reconstructed samples, coming from images of lower layers located around the group of blocks sgldx. The algorithm for constructing this reference set ErefIdx is detailed with reference to FIG. 8.

According to step S141 (respectively S142), once the reference image refIdx has been constructed for the current group of blocks sgldx, the motion estimation is performed for each macroblock of that group of blocks. It provides a motion vector and a measurement of the distortion between the processed macroblock and the calculated reference macroblock. This motion estimation is repeated for the current group of blocks sgldx, successively using each enhanced reference image ErefIdx (steps S151 to S162).

Once the successive motion estimations have been completed, a deciding step (step S7) determines the optimum choice (in terms of rate-distortion for example) of the prediction mode, unidirectional or bidirectional, as well as the prediction image or images used. This determination, for example based on a Lagrangian optimization, is known to the person skilled in the art and is not detailed here. The appropriate index refIdx of the prediction image or images as well as the coordinates of the corresponding motion vector or vectors are coded and added to the compressed bitstream, this information of course being indispensable for the decoder.

The use of this information to perform the complete video coding, including the calculation of the residual prediction error signal and its compression and coding, is performed in known manner according to the SVC format and is not described here.

The method is repeated for each rectangular group of blocks of index sgldx constituting the current image (steps S8 and S9).

Figure 8:
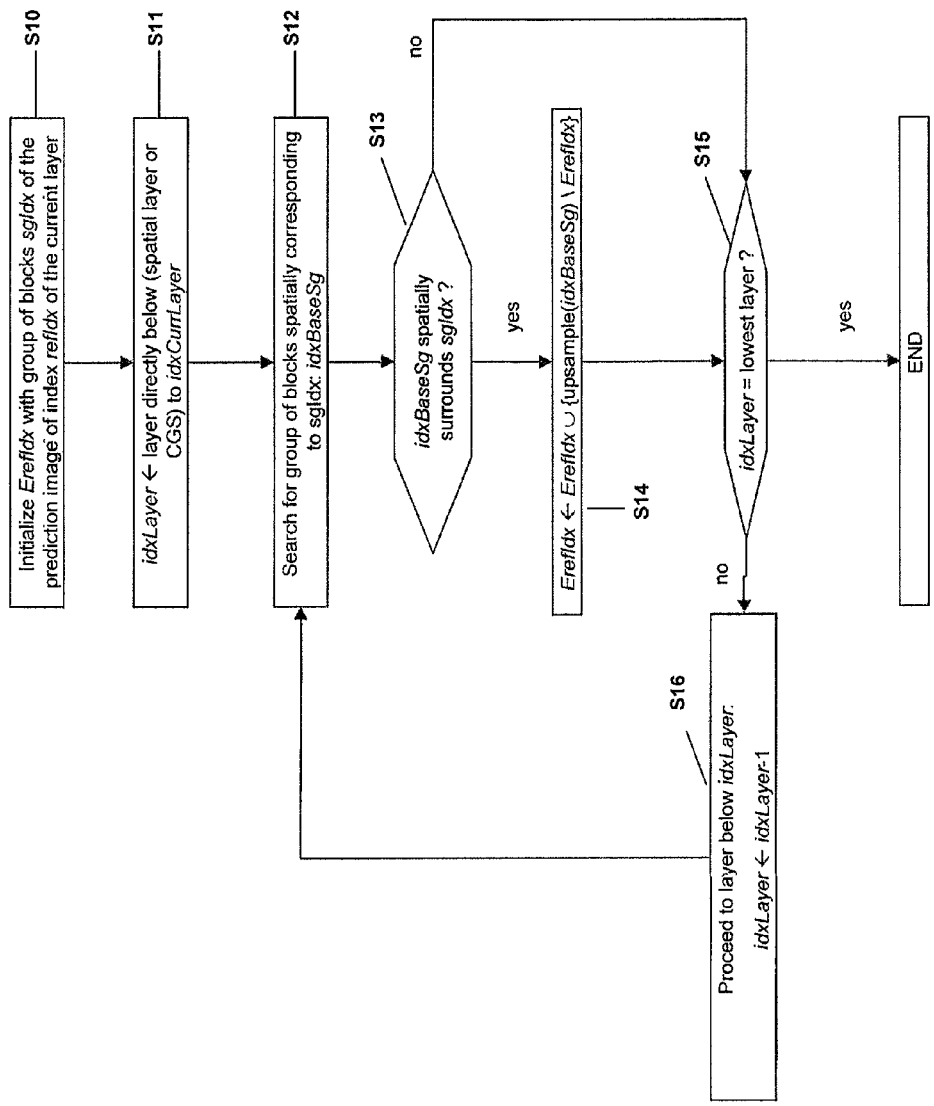
FIG. 8 is a construction of the extended reference set of pixels for the motion estimation according to the invention.

FIG. 8 is a construction of the reference set for the motion estimation.

More particularly, FIG. 8 provides the algorithm for construction of an enhanced reference image for the motion estimation, performed by the coder during step S131 or S132 of FIG. 7.

The inputs to this algorithm are the following:

the current group of blocks sgldx;

the index of the prediction image considered for the motion estimation refIdx;

the index of the current refinement layer (spatial or CGS) idxCurrLayer.

As explained with reference to FIG. 7, the reference image ErefIdx is first of all initialized at step S10 with the pixels of the current group of blocks sgldx of the prediction image refIdx of the current layer.

At the start of the algorithm (step S11), a layer index idxLayer of the SVC hierarchy is initialized to the index of the layer directly below the current layer of index idxCurrLayer. In this lower layer idxLayer the image is then considered which corresponds temporally to the current prediction image of index refIdx of the layer idxCurrLayer. In this temporally corresponding image, a search is made (step S12) for the group of blocks which corresponds spatially to the group of blocks sgldx of the prediction image refIdx. The group of blocks found is denoted idxBaseSg. If this group of blocks found spatially surrounds the group of blocks of the top layer sgidx (step S13), it is then usable for enhancing the reference image ErefIdx. The reference image ErefIdx is then modified (step S14) by composing it with the spatial portion of the group of blocks idxBaseSg which spatially surrounds the current content of the image ErefIdx, as was illustrated in FIG. 6 described earlier. In the case in which the layer of index idxLayer is a layer of lower spatial resolution with respect to the current layer, this composition operation involves upsampling (denoted "upsample" in the drawing) the spatial portion of idxBaseSg before its addition to the reference image ErefIdx.

Looping (step S15) is then performed on the layer index to proceed to the layer directly below that of index idxLayer (step S16), and the steps of testing and composing the reference image in course of modification are repeated with new image portions surrounding it. The algorithm ends when the lowest layer has been reached.

Figure 9:
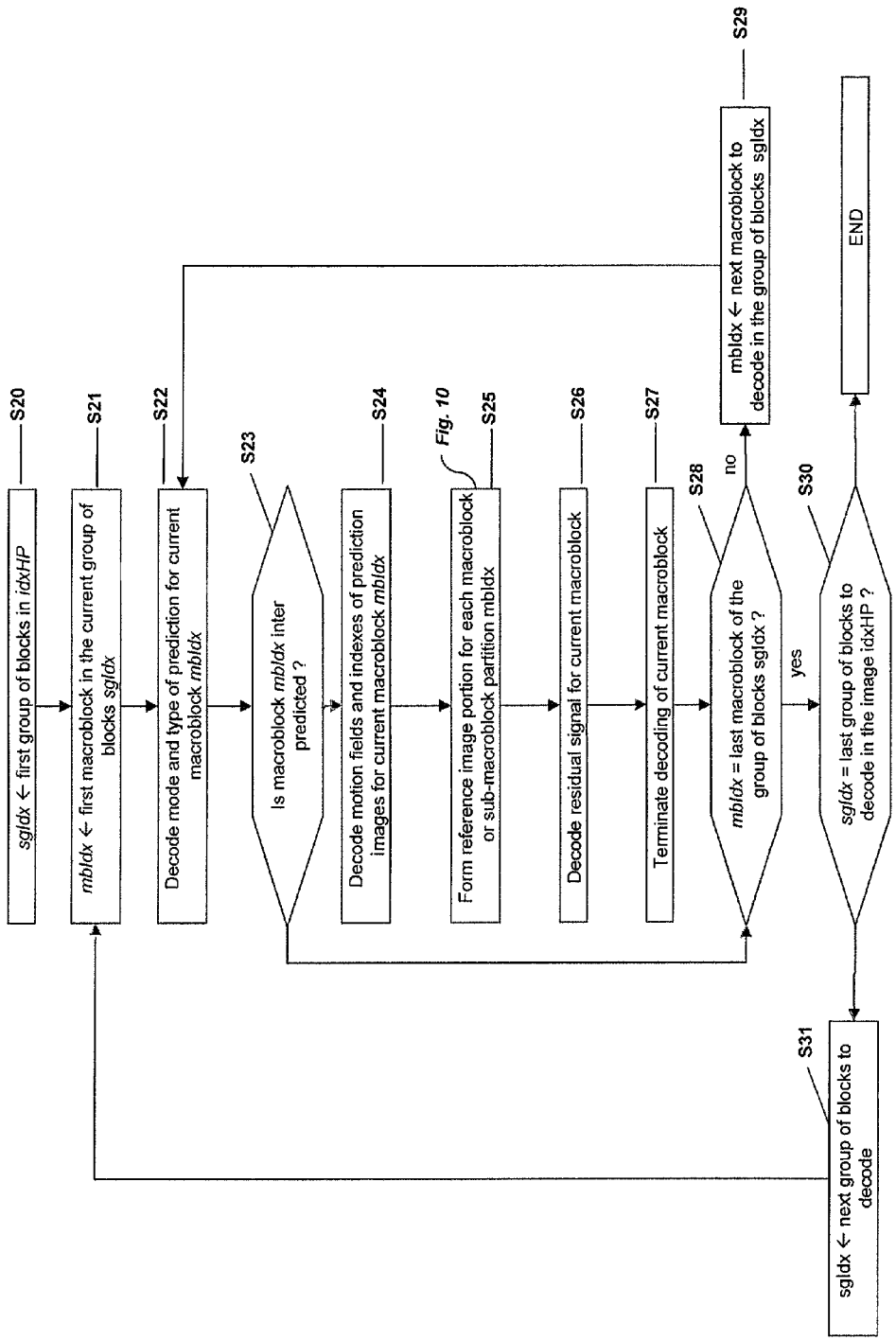
FIG. 9 is an algorithm for decoding a high-pass image according to the invention.

FIG. 9 provides an algorithm for decoding and inverse prediction (inverse prediction step) according to the invention in the inverse MCTF schema of a high-pass image of a spatial or CGS refinement layer.

The inputs to the algorithm are the following:

index of the current high-pass image idxHP;

index of the current refinement layer idxLayer.

The algorithm successively processes (step S20) the groups of blocks constituting the image of index idxHP in the refinement layer idxLayer. For each group of blocks sgldx, a loop (step S21) going through the macroblocks making it up is carried out. For each macroblock mbldx, decoding is performed (step S22) from the bitstream of the coding mode and the type of prediction used for mbldx. In the case in which mbldx is predicted temporally (step S23), the parameters of temporal prediction (index of prediction image, motion vectors) of that macroblock are decoded (step S24). The following step (S25) consists of forming the reconstructed image portion useful for performing the motion compensation step. This step is modified in accordance with the present invention with respect to the SVC in place, and is detailed by the algorithm of FIG. 10. What follows (step S26) in the processing of the current macroblock provides for decoding the residual signal associated with this temporally predicted macroblock, and for adding (step S27) the prediction error thus decoded to the blocks of reference samples provided by the algorithm of FIG. 10.

Looping is then performed (steps S28 and S29) on the next macroblocks of the group of current blocks. When all of its macroblocks have been processed, looping is then performed (steps S30 and S31) on the following group of blocks in the high-pass image in course of inverse prediction in the inverse MCTF.

Finally it is to be noted that it is possible for a deblocking filter step, useful for reducing the effects of blocks inherent in macroblock based video coding, to be executed once all the macroblocks of the current image have been reconstructed. The activation of the deblocking filter is decided as specified in the prior art and is not detailed here.

Figure 10:
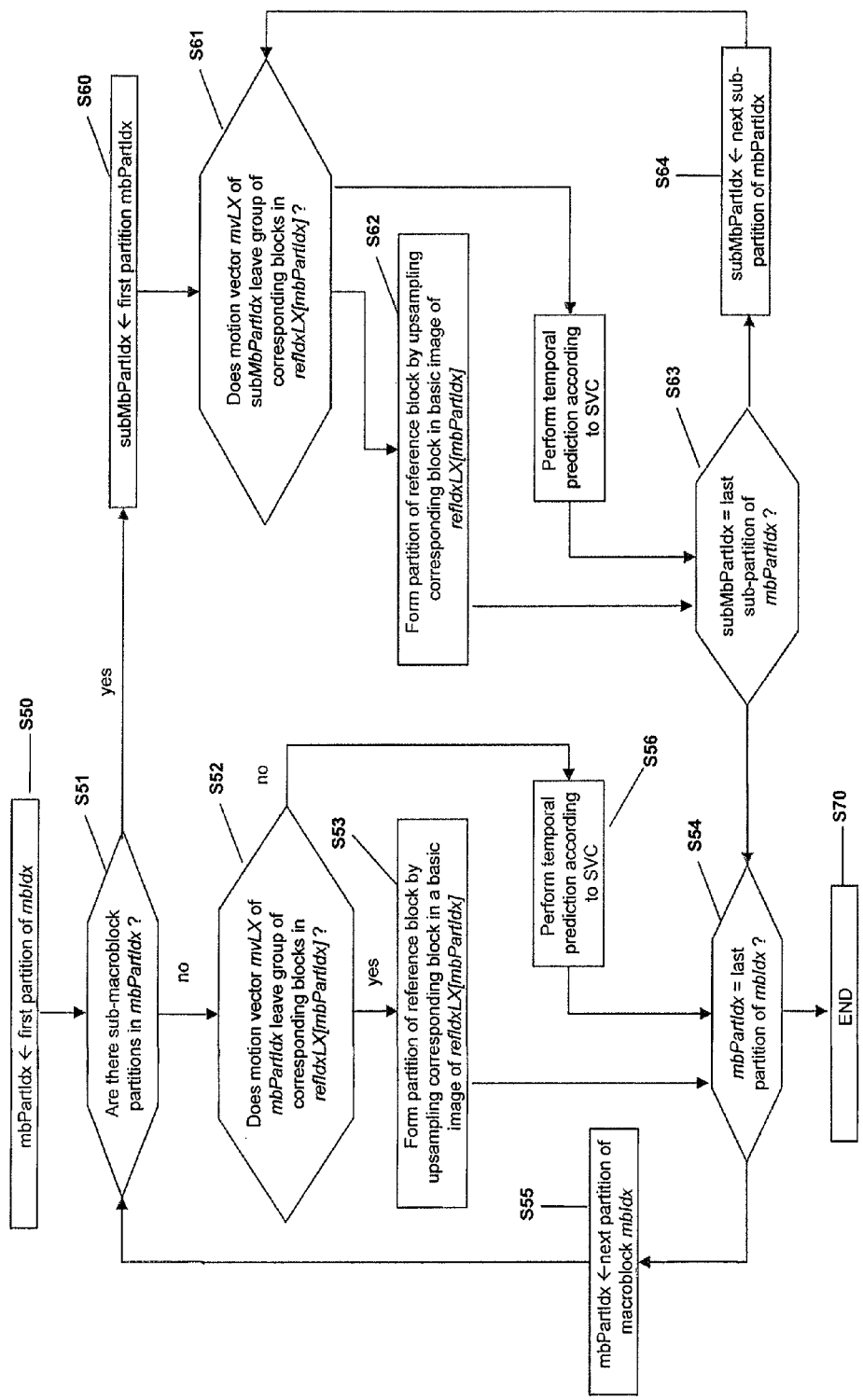
FIG. 10 represents the detection of the prediction mode according to the invention and construction of the reference block.

FIG. 10 represents the detection of the prediction mode according to the invention and construction of the reference block serving as temporal reference for the prediction of a macroblock mbIdx of an image idxHP in course of inverse prediction within the inverse MCTF.

The inputs (step S50) to this algorithm are the following:
index of the current high-pass image in course of inverse prediction: idxHP.
index of the current macroblock in idxHP: mbIdx;
index of the current rectangular group of blocks sgIdx;
indices of the prediction images for the partitions of the current macroblock: refIdxL0[] and refIdxL1[].

The algorithm consists of going through each block (macroblock or sub-macroblock partition) according to the coding mode used for the current macroblock mbIdx.

For each partition mbPartIdx of the current macroblock, a test (step S51) is carried out to determine whether there are sub-macroblock partitions in that macroblock.

In the negative, for the partition mbPartIdx and for each motion vector mvLX (X successively taking the values 0 and then 1) associated with that partition, the coordinates of the motion vector are tested (step S52). If they are such that the motion vector goes out of the current group of blocks sgIdx in the prediction image refIdxLX[mbPartIdx], then this means that the prediction mode in accordance with the present invention is used for the partition of the macroblock mbPartIdx. In this case, a step (step S53) is carried out of forming the reference block of reconstructed samples for the prediction of mbPartIdx. This construction, illustrated earlier with reference to FIG. 5, consists of extracting from a basic image of refIdxLX[mpPartIdx] the block of pixels that corresponds, in terms of spatial location, to the macroblock partition indicated by the motion vector mvLX in the prediction image refIdxLX[mpPartIdx]. Where the current refinement layer constitutes a spatial refinement with respect to the basic layer considered, spatial upsampling is applied to the extracted block of reconstructed samples.

If the test at step S51 on the presence of partitions of sub-macroblocks is positive, a loop is triggered (step S60) on the indices of partitions of sub-macroblocks, denoted subMbPartIdx. For each sub-macroblock partition subMbPartIdx, a test (step S61) is performed on its motion vector mvLX that is similar to that described earlier, to determine whether its motion vector goes out of the group of blocks sgIdx in the prediction image refIdxLX[mbPartIx]. If that is the case, construction of a reference block (step S62), similar to that (step S53) applied for the macroblock partitions, is carried out for the current sub-macroblock partition. Looping (steps S63 and S64) is thus performed on all the sub-macroblock partitions of the current macroblock mbIdx: finally, looping (steps S54 and 55) is performed on the macroblock partition index mbPartIdx: the next partition of mbIdx is proceeded to and all the above steps are then repeated from the test (step S51) in order to evaluate whether the current macroblock is divided into sub-macroblock partitions. The algorithm terminates (step S70) when all the partitions of the macroblock mbIdx have been processed.

It should be stated that, in the steps described above, the index X successively takes the values 0 and then 1. This is because, as the temporal prediction of the macroblock and sub-macroblock partitions is uni- or bidirectional, two lists of prediction images refIdxL0 and refIdxL1, that are respectively useful for the forward prediction and for the backward prediction, are generated by the coder and the decoder. For concision, the FIG. 10 algorithm is described with the generic term X, which successively takes the values 0 and 1. In other words, the series of steps involving a prediction image or a motion vector are thus repeated for each value of X.

The invention claimed is:

1. A method of temporal prediction using motion estimation in a sequence of digital images in the context of coding in a bitstream comprising at least first and second layers linked to each other in a chosen hierarchical relationship of scalability, each image of the second layer comprising a plurality of groups of blocks of pixels, said coding enabling access to spatial parts of the images, the method of temporal prediction being applied to at least one current group of an image of a current second layer of the sequence, wherein the method comprises the following steps:
constructing at least one set of reference pixels for the temporal prediction on the basis of information from a prediction image of the second layer from a prediction image of the second layer, or, if signaled, spatially complementary information from an image of the first layer corresponding temporally to said prediction image, wherein pixels in an image of the second layer that are used for temporal prediction are restricted to a group of blocks of said prediction image corresponding to a group of pixels to be predicted; and
for each block of the current group of the image of the current second layer, searching for at least one block of the referenced set of pixels so constructed that is suitable for the temporal prediction, and determining at least one corresponding motion vector; and
wherein the bitstream further comprises a third layer and the step of constructing at least one reference set of pixels comprises a step of increasing the number of reference pixels for the temporal prediction on the basis of complementary information from an image of the third layer temporally corresponding to said prediction image.

2. A method according to claim 1, in which the coding of the bitstream is of the Scalable Video Coding type.

3. A method according to claim 1, in which the information from the second layer contained in the reference set of pixels is data from the current group of the prediction image of the second layer.

4. A method according to claim 3, in which the complementary information is data belonging to the group corresponding spatially to the current group in the first layer and spatially surrounding the data of the set of reference pixels.

5. A method according to claim 1, in which the images of the first layer each comprise a single group of blocks of pixels.

6. A method according to claim 1, in which the configuration of the groups of blocks of the second layer is rectangular.

7. A method according to any one of the preceding claims, in which the second layer is a refinement layer of spatial scalability.

8. A method according to claim 7, in which said complementary data are upsampled to the spatial resolution of the reference set of pixels.

9. A method according to any one of claims 1 to 6, in which the second layer is a refinement layer of quality scalability.

10. A method according to any one of claims 1 to 6, wherein the prediction image belongs to at least one list of prediction images.

11. A method of coding a sequence of digital images in a bitstream comprising at least first and second layers linked to each other in a chosen hierarchical relationship of scalability, each image of the second layer comprising a plurality of groups of blocks of pixels, said coding enabling access to spatial parts of the images, wherein for at least one current group of an image of the second layer of the sequence, the method comprises the steps of:
performing temporal prediction using motion estimation according to any one of claims 1 to 6, providing, for each block of the current group, at least one prediction image index and at least one associated motion vector; and
for each block of the current group, coding the at least one prediction image index and the at least one associated motion vector so obtained.

12. A method of decoding a sequence of digital images coded in a bitstream comprising at least first and second layers linked to each other in a chosen hierarchical relationship of scalability, each image of the second layer comprising a plurality of blocks of pixels, comprising a temporal prediction using motion compensation for at least one current group, wherein the decoding of at least one current block of said group of an image of the second layer comprises the following steps:
decoding at least one index of a prediction image of the second layer and at least one motion vector associated with said block;
verifying whether the motion vector so decoded goes out of the current group in the prediction image;
in case of positive verification, extracting data on the basis of information from the prediction image, or if signaled, data from the image of the first layer temporally corresponding to the prediction image, that spatially corresponds to a position indicated by the motion vector and that are spatially complementary with respect to the current group, wherein pixels in an image of the second layer that are used for temporal prediction are restricted to a group of pixels of said prediction image corresponding to a group of pixels to be predicted; and
using the data so obtained for the motion compensation; and
wherein the bitstream further comprises a third layer and the step of extracting in case of positive verification comprises extracting from an image of the third layer, temporally corresponding to the prediction image, of data spatially corresponding to the position indicated by the motion vector.

13. A method according to claim 12, in which the second layer is a refinement layer of spatial scalability.

14. A method according to claim 13, in which the data obtained from the first layer are upsampled to the resolution of the at least one current block.

15. A method according to claim 12, in which the second layer is a refinement layer of quality scalability.

16. A method according to any one of claims 12 to 15, in which the coding of the bitstream is of Scalable Video Coding type.

17. A device for temporal prediction using motion estimation in a sequence of digital images in the context of coding in a bitstream comprising at least first and second layers linked to each other in a chosen hierarchical relationship of scalability, each image of the second layer comprising a plurality of groups of blocks of pixels, said coding enabling access to spatial parts of the images, the temporal prediction being applied to at least one current group of an image of a current second layer of the sequence, wherein the temporal prediction device comprises: means for constructing at least one set of reference pixels for the temporal prediction on the basis of information from a prediction image of the second layer, or, if signaled, spatially complementary information from an image of the first layer corresponding temporally to said prediction image, wherein pixels in an image of the second layer that are used for temporal prediction are restricted to a group of blocks of said prediction image corresponding to a group of pixels to be predicted; and
processing means constructed to adapted, for each block of the current group of the image of the current second layer, search for at least one block of the reference set of pixels so constructed that is suitable for the temporal prediction, and to determine at least one corresponding motion vector; and
wherein the bitstream further comprises a third layer and the step of extracting in case of positive verification comprises extracting from an image of the third layer, temporally corresponding to the prediction image, of data spatially corresponding to the position indicated by the motion vector.

18. A device for coding a sequence of digital images in a bitstream comprising at least first and second layers linked to each other in a chosen hierarchical relationship of scalability, each image of the second layer comprising a plurality of groups of blocks of pixels, said coding enabling access to spatial parts of the images, wherein for at least one current group of an image of the second layer of the sequence, the device comprises:
means for prediction using motion estimation in accordance with claim 17, providing, for each block of the current group, at least one prediction image index and at least one associated motion vector, and
coding means that are constructed to, for each block of the current group, code the at least one prediction image index and the at least one associated motion vector so obtained.

19. A device for decoding a sequence of digital images coded in a bitstream comprising at least first and second layers linked to each other in a chosen hierarchical relationship of scalability, each image of the second layer comprising a plurality of groups of blocks of pixels, comprising a temporal compensation using motion compensation for at least one current group, wherein the device comprises, for the decoding of at least one current block of said group of an image of the second layer:
means for decoding the at least one index of the prediction image and at least one motion vector associated with said block;
verifying means for verifying whether the motion vector so decoded goes out of the current group in the prediction image;
processing means that are constructed to, in case of positive verification, extract data on the basis of information from the prediction image, or, if signaled, data from the image of the first layer temporally corresponding to the prediction image that spatially correspond to the position indicated by the motion vector and that are spatially complementary with respect to the current group, wherein pixels in an image of the second layer that are used for temporal prediction are restricted to a group of blocks of said prediction image corresponding to a group of pixels to be predicted, and constructed to use data so obtained for the motion compensation;

wherein the bitstream further comprises a third layer and the step of extracting in case of positive verification comprises extracting from an image of the third layer, temporally corresponding to the prediction image, of data spatially corresponding to the position indicated by the motion vector.

20. A computer-readable non-transitory medium that stores instructions of a computer program enabling the implementation of a method according to any one of claims 1 to 6 or 12 to 15 when that program is loaded and run by a computer system.

\* \* \* \* \*